United States Patent [19]

Sampsell et al.

[11] Patent Number: 5,037,173
[45] Date of Patent: Aug. 6, 1991

[54] OPTICAL INTERCONNECTION NETWORK

[75] Inventors: Jeffrey B. Sampsell; Terrance G. McDonald, both of Plano, Tex.

[73] Assignee: Texas Instruments Incorporated, Dallas, Tex.

[21] Appl. No.: 441,129

[22] Filed: Nov. 22, 1989

[51] Int. Cl.⁵ .................................. G02B 6/32
[52] U.S. Cl. ........................... 385/17; 385/33; 385/24
[58] Field of Search ............... 350/96.18, 96.13, 96.15, 350/96.16, 96.20

[56] References Cited

U.S. PATENT DOCUMENTS

| | | | |
|---|---|---|---|
| 4,454,547 | 6/1984 | Yip et al. | 358/293 |
| 4,811,210 | 3/1989 | McAulay | 350/96.15 X |
| 4,856,863 | 8/1989 | Sampsell et al. | 350/96.16 |
| 4,859,012 | 8/1989 | Cohn | 350/96.16 X |

Primary Examiner—John D. Lee
Assistant Examiner—Phan T. Heartney
Attorney, Agent, or Firm—James C. Kesterson; James T. Comfort; Melvin Sharp

[57] ABSTRACT

A crossbar switch (500) with input optical fibers (571, ... 586) and output optical fibers (511, ... 526) having ends connected to transmitters (551, ... 554) and receivers 561, ... 564), respectively, and other ends in linear arrays (545, 546) that are adjacent to linear micro lens arrays (540, 542) and a linear spatial light modulator (530) with light emitted from an input fiber end reflected back into an output fiber end for pixels deflected in one direction in the spatial light modulator (530) and lost for pixels deflected in another direction. Other embodiments include reflection from a pixel directly back into the same fiber which is bifurcated.

11 Claims, 11 Drawing Sheets

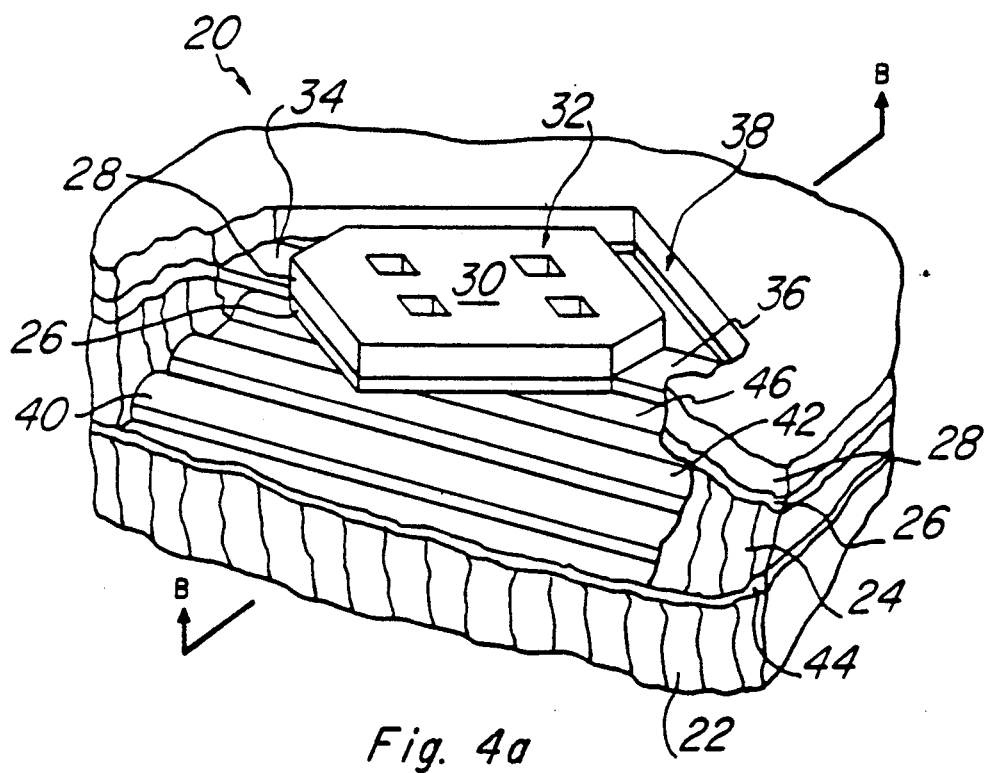
Fig. 4a
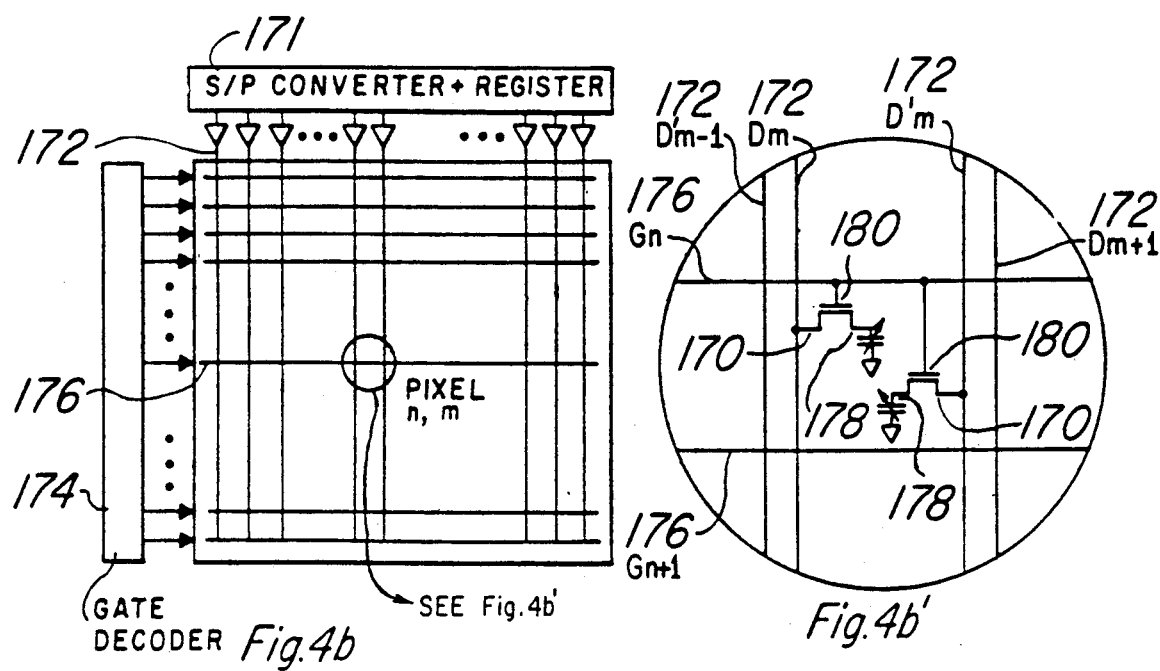
Fig. 4b
Fig. 4b'

OPTICAL INTERCONNECTION NETWORK

CROSS-REFERENCE TO RELATED APPLICATIONS

U.S. Pat. Nos. 4,811,210 (McAulay); 4,859,012 (Cohn); and 4,856,863 (Sampsell and McDonald) disclose related subject matter. These cross-referenced patents are assigned to the assignee of the present application.

BACKGROUND OF THE INVENTION

1. Field of the Invention

The present invention relates to interconnection networks, and, more particularly, to multichannel switches using spatial light modulators for reconfigurable switching of multiple inputs to multiple outputs.

2. Description of the Related Art

Reconfigurable interconnection of several high data rate transmitters to several receivers is a cumbersome and technically difficult task. However, reconfigurable interconnection networks (including reconfigurable crossbar switches) underlie a variety of devices such as high computation rate parallel computing architectures where numerous processors route information to each other or share common resources, communications switching as in telephone switching centers, and aircraft fiber optic busses that require reconfigurability to allow redundancy for fault tolerance and the ability to share several sensors with several processors. Crossbar switches are, in effect, $N \times M$ arrays of switches for connecting each of N inputs to any or all of M outputs. Some applications, such as aircraft avionics systems, supercomputer processor interconnects, and local area networks require only moderate size arrays (N, M ≈ 20) but demand the high bandwidth and noise immunity found in optical interconnections plus mechanical ruggedness. Easy reconfigurability of the crossbar switch is desirable in other applications such as mobile and fixed networks, industrial controls, and interconnections between local area networks and mainframe computers.

Very large scale integration in semiconductor devices is also leading towards the greater use of parallelism. Parallelism requires some sort of interconnection between the processing elements and this introduces a trade off between speed and the ability to handle a wide range of algorithms. For example, a complex interconnection network provides some flexibility at the expense of speed, and high speed may be achieved by means of fixed interconnections for a specific algorithm. The problem is to achieve very high speed by efficiently using a large number of processing elements and at the same time retain extremely high algorithm flexibility. Efficiency for parallel processing is 'the gain in speed versus that using a single processor of the same type' divided by 'the number of processors'. Also, the complexity of the processing elements relates to the degree of parallelism obtainable; sophisticated computations tend to have parts that are not parallelizable at a coarse level. The overall speed is dominated by the parts which are non-parallelizable at a coarse level. And a large number of fast elementary processors places a considerable communication burden on the interconnection between processors. There is a need for parallel processor interconnections that posses simple reconfigurability.

Fixed interconnections limit the range of algorithms which may be efficiently implemented. Systolic configurations, such as those in development at Carnegie-Mellon University (Kung H.T., Why Systolic Architectures?, IEEE Computer, January, 1982 p37-46), use algorithm structure to reduce memory and instruction fetches. This reduces communication time and permits large numbers of processors to be efficiently used in parallel. However, the algorithm constraints are significant because of the fixed interconnections.

Algorithm flexibility may be achieved by complex reconfigurable interconnection networks, and a prototype system having 8 processors and using a Banyan switch is in operation at the University of Texas at Austin (Browne J. C., Parallel Architectures for Computer Systems, Physics Today, Vol. 37, No. 5, May 1984). A Banyan is a multichannel switch composed of levels of $2 \times 2$ switches. However, this type of reconfigurability introduces large delays and high control overhead in most proposed systems and this restricts the number of processors and the speed of the system.

Small commercial crossbar switches made entirely of semiconductor devices have recently become available; for example, the AS8840 chip from Texas Instruments. The AS8840 is a 16-port crossbar integrated circuit which is dynamically reconfigurable; each of the ports handles a nibble (four bits) bidirectionally.

However, electromagnetic interference has been difficult to control in most electronic implementations of reconfigurable crossbar switches, and most electronic implementations also require a dense interconnection scheme that is either difficult or time consuming to fabricate.

Optical crossbar switches have been suggested to overcome the electromagnetic interference and bandwidth problems. Indeed, the communications industry makes widespread use of optical fibers and is developing optical switching devices to avoid conversion to electronics and back for switching purposes. Optics has been suggested for communication with VLSI to overcome the bandwidth pin limitations and edge connection constraints; see Goodman J. W., Leonberger F. J., Kung S. Y. and Athale R. A., Optical Interconnections for VLSI Systems, Proc. IEEE, Vol. 72, No. 7, July 1984, p850-866.

D. Grant et al, An Optical Phased Array Beam Steering Technique, 1971 Proceedings of the Electro Optic System Design Conference pages 259-264, describes reflection of collimated light from a membrane spatial light modulator which is passed through a sampling mask and the phase variations caused by the pixels of the spatial light modulator combine to form a single spot on a receiver array. Varying the pixel deformations controls the phase variations and thereby steers the spot across the receiver array.

A. McAulay et al. have discussed design considerations and light budget for a large (N > 100) optical crossbar switch using DMD arrays as the reconfigurable switch element; this appears in the milestone and final reports for DARPA Contract N00014-85-C-0755 administered by the Office of Naval Research and in R. Cohn, Link Analysis of a Deformable Mirror Device Based Optical Crossbar Switch, Proc. SPIE 825 (1987).

However, the known optical interconnection networks for high speed data transmission are limited primarily by the performance of the optical switching elements which tend to restrict wavelength, polarization, switching speed, dynamic range, and switch topology. Additionally, current systems suffer from significant limitations in the areas of mechanical ruggedness, and optical power handling efficiency.

SUMMARY OF THE INVENTION

The present invention provides an optical interconnection network using a reflective spatial light modulator with optical fibers for input and output and imaging lenses that image the optical fiber ends on the spatial light modulator and reimage the reflected light back onto optical fiber ends. Each pixel of the spatial light modulator acts as a switch between one of the inputs and one of the outputs, and the network can be reconfigured by simply addressing selected pixels to disrupt the reflection back to the fiber ends.

Preferred embodiments use bifurcated optical fibers with a common end for both emitting light toward the spatial light modulator and receiving the light reflected from the spatial light modulator. Other preferred embodiments separate optical fibers for input to and output from the spatial light modulator. For N inputs and M outputs preferred embodiments use an N×M-pixel linear deformable mirror device with N×M optical fibers in a linear bundle and the imaging by a N×M-element linear lens array. The linear lens array may be glued to the linear array of fiber ends, and the linear deformable mirror device may, in turn, be glued to the linear lens array to provide a mechanically rugged structure. Alternatively, the deformable mirror device may be accurately positioned relative to the lens array through the use of a self-aligning connector. Such a connector sacrifices a small amount of mechanical integrity to gain increased serviceability.

The bifurcated optical fibers bundled together and imaged on the deformable mirror device with the reflected light imaged back on the optical fibers solves the crossbar switch problems of reconfigurability, electromagnetic interference, crosstalk, and mechanical ruggedness.

BRIEF DESCRIPTION OF THE DRAWINGS

The drawings are schematic for clarity.

FIGS. 4a-c illustrate torsion beam deformable mirror devices;

DESCRIPTION OF THE PREFERRED EMBODIMENTS

A preliminary description of reconfigurable optical crossbar switches will be followed by descriptions of the preferred embodiments. Generally, a crossbar switch permits N inputs to be connected to K outputs with each output equal to none or one or a sum of selected inputs. The crossbar switch itself is an off-on device and typically handles digital data streams; and a reconfigurable crossbar switch simply permits changing the selections of inputs which determine outputs.

Figure 1A:
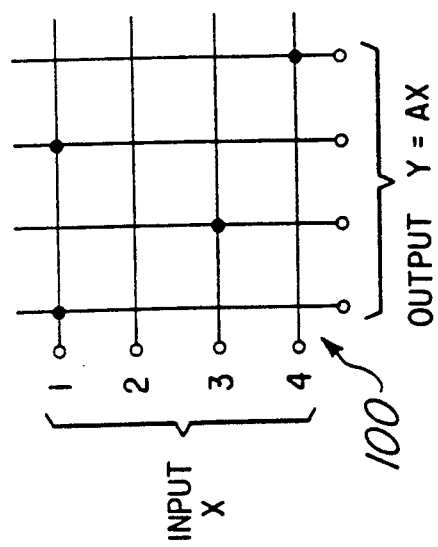
FIGS. 1a-b schematically illustrate an optical crossbar switch.
Figure 1B:
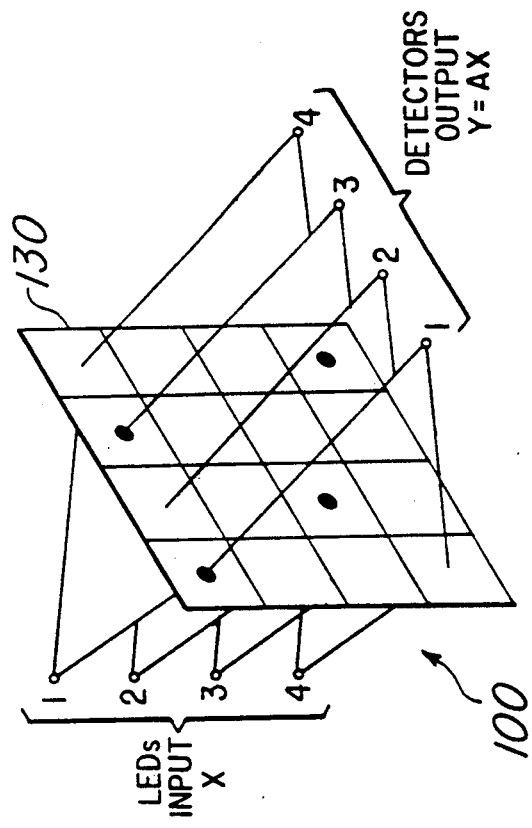

FIG. 1a schematically illustrates a 4 by 4 crossbar switch 100. Each intersection has a switch permitting a horizontal input line to be coupled with a vertical output one. Blackened circles indicate closed switches. One output receives information from one input, but one input may broadcast to several outputs. FIG. 1b shows a diagrammatic crossbar switch 100 implemented with spatial light modulator 130. Blackened circles again indicate transparent regions consistent with the settings of FIG. 1a. An optical lens system (not illustrated) is used to spread the light from the input sources (LEDs 1-4) horizontally without spreading the light vertically. Light passing through spatial light modulator 130 is collapsed onto receiving diodes (Detectors 1-4) by means of a lens system (not illustrated) which focusses vertically without spreading horizontally. Information is transmitted through switch 100 by encoding the information as modulation of the transmitter light beams and received by demodulating the received signals.

Figure 2:
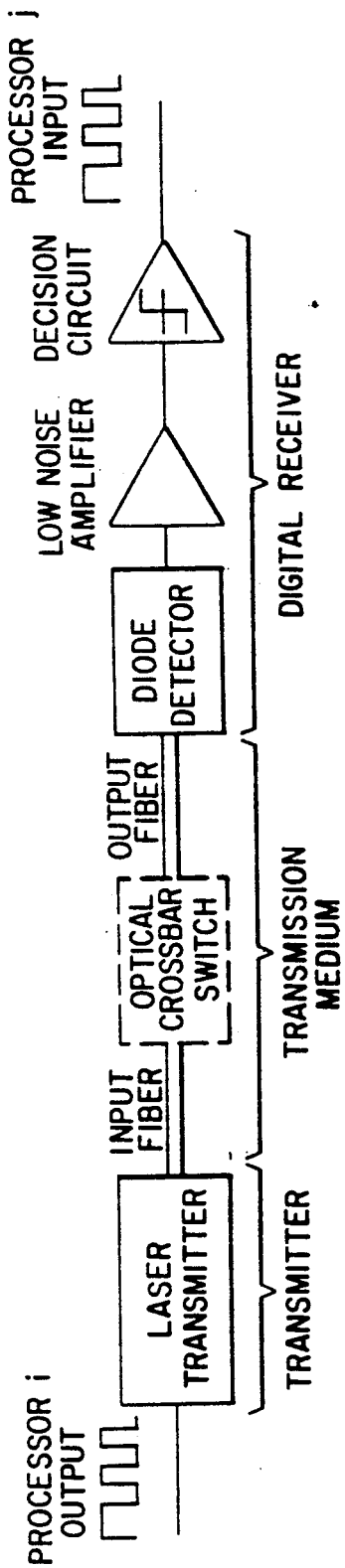
FIG. 2 illustrates a crossbar switch in a communication link.

FIG. 2 shows an optical crossbar switch as a communication link consisting of transmitter, receiver, and the transmission medium. The transmission medium includes short lengths of optical fiber and open-air optics. Compared to long distance links, where the large fiber attenuation decreases the signal to noise ratio prior to the detector, losses in a crossbar are due primarily to reflection, and noise contribution is due primarily to the receiver without consideration of transmitter laser noise.

Figure 3:
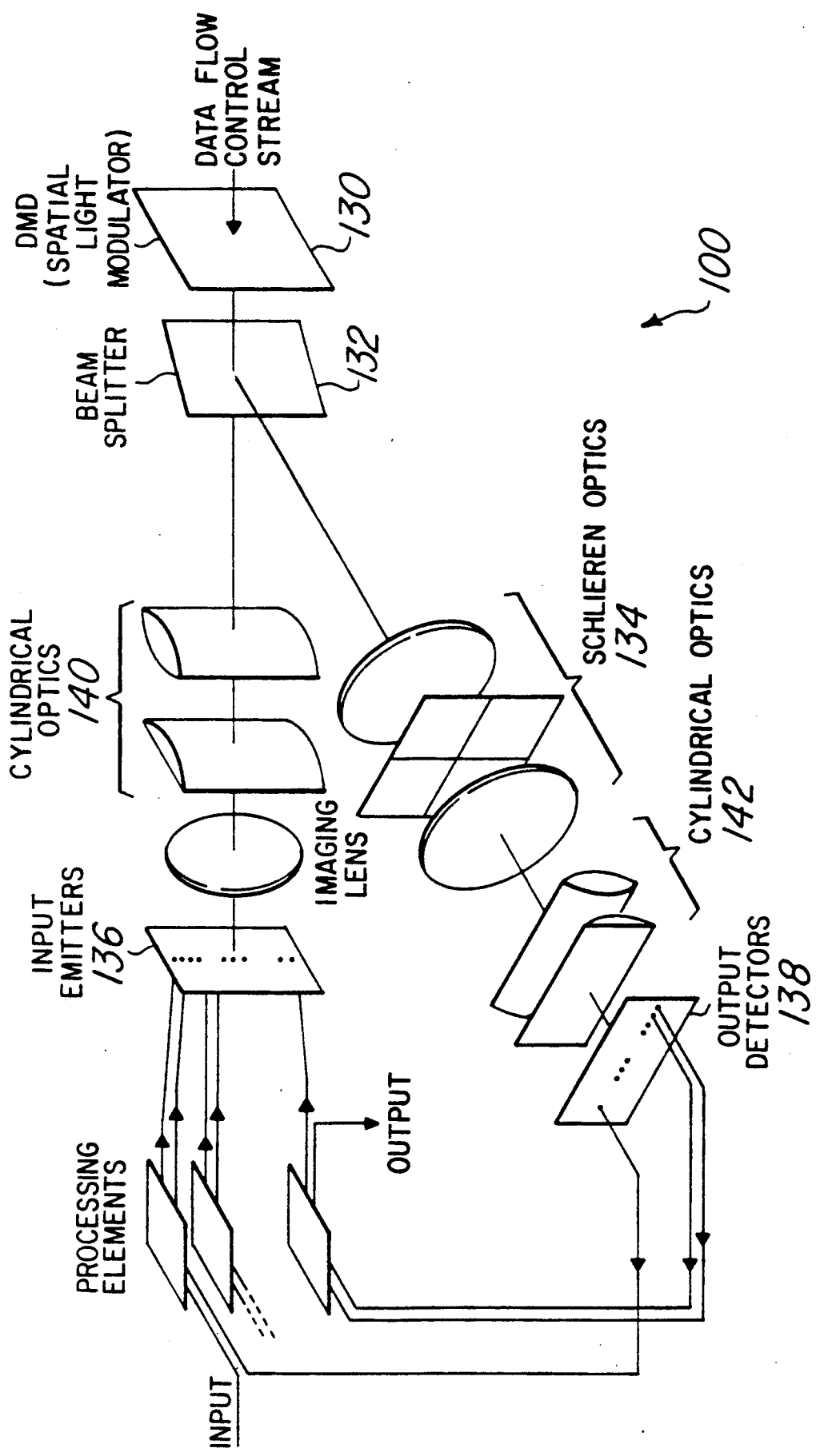
FIG. 3 shows the open-air portion of a crossbar switch.

FIG. 3 illustrates optical crossbar switch 100, functioning as a programmable interconnection network between computational processing elements, as implemented by a deformable mirror device (DMD) as a reflective spatial light modulator 130 together with connections to the switch for a plurality of processors. DMDs act as reflectors rather than transparent spatial light modulators, consequently, the optical path following the spatial light modulator is folded back upon itself. A beam splitter 132 is used to separate the returning light from the incident light. (Alternatively, tilting DMD 130 relative to the optic axis may avoid a beam splitter.) Schlieren optics 134 are used to block reflections from the regions between pixels and from undeflected pixels of DMD 130. Laser diodes 136, with modulation capability to 3 GHz will act as sources and p-i-n diodes 138 as detectors. The optics not illustrated in FIG. 1b are schematically shown in FIG. 3: cylindrical optics 140 spreads the light from the input sources 136 horizontally and cylindrical optics 142 collapses the light vertically onto the receiving diodes 138. Of course, the lenses illustrated are functional representations of complex practical optics. The light sources 136 and receivers 138 could be integrated directly on the processing elements.

Figure 4C:
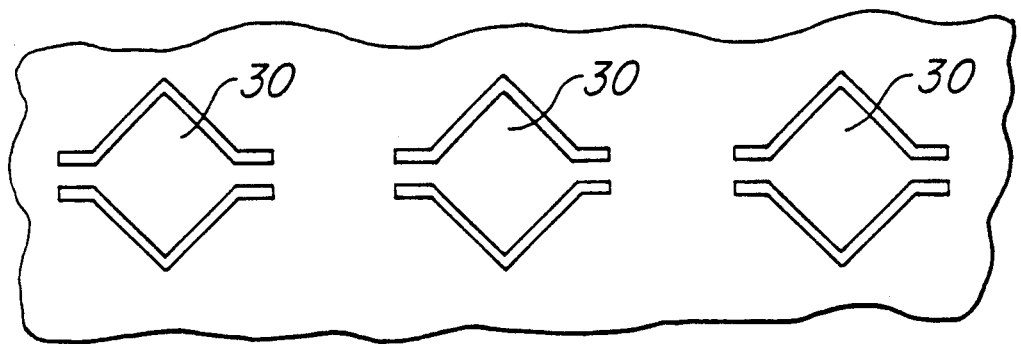

Deformable mirror devices with pixels of the membrane, cantilever beam, and torsion beam types have been developed. The results for imaging and performing spectral analysis with a membrane DMD have been published in D. R. Pape, L. J. Hornbeck, Opt. Eng., 22(6), 675 (1983), and descriptions of cantilever beam and torsion beam DMDs appear in L. J. Hornbeck, U.S. Pat. Nos. 4,566,935 and 4,596,992 and copending application Ser. No. 168,724, filed Mar. 16, 1988. A typical cantilever beam or torsion beam DMD based on an X-Y array of pixels that can be addressed by an underlying array of MOS transistors is shown in FIGS. 4a-d. FIG. 4a is a perspective view of a single pixel (one mirror element 30 per pixel) and FIG. 4b is a schematic view of the array. A reflecting conductive metal layer 26–28 covers the surface of the array and has cutouts forming mirrors elements 30. The line-addressed organization of the DMD is shown in FIG. 4b; data are fed to a serial-to-parallel converter 171 that is connected to the drain lines 172 and drains 170 of the MOS transistors. Drain lines 172 are charged (the $m^{th}$ line 172 is charged to a potential $\phi_{n,m}$), and decoder 174, connected to gate lines 176 and gates 180 of the MOS transistors, selects the $n^{th}$ gate line 176 to turn on. Floating sources 178 of the MOS transistors connected to the $n^{th}$ gate line 176 are then charged to the potential of the corresponding drain 172 (the $m^{th}$ charged to $\phi_{n,m}$). The floating sources are the electrodes for deflecting mirror elements 30. The gates 180 are then turned off, and mirror elements 30 are held at a fixed potential of $V_M$, thus an electrostatic force proportional to $V_M - \phi_{n,m}$ acts on the $(n,m)^{th}$ mirror element and causes it to deflect down towards the floating source 178. The mechanical response time of a mirror element and hence line settling time is a few $\mu$sec. Once the floating sources 178 in the $n^{th}$ gate line 176 have been set, then the next line of data is fed into drain lines 172, and the next gate line 176 selected by decoder 174. The typical size of the mirror elements for the membrane and cantilever beam and torsion beam devices is in the order of 25 to 50 microns square. FIG. 4c is a plan view showing the arrangement of mirror elements 30 for a linear array DMD.

Figure 5:
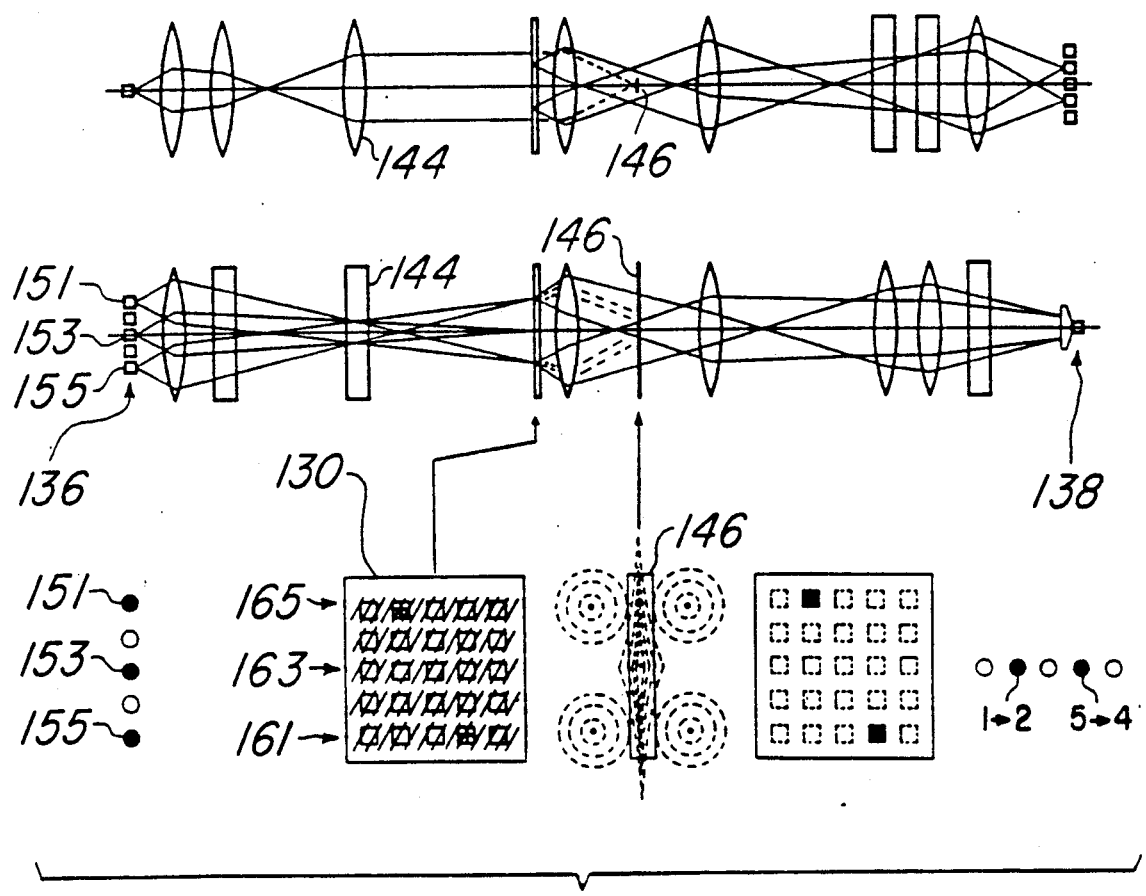
FIG. 5 shows ray tracings in a crossbar switch.

FIG. 5 is a detailed layout for the optical crossbar switch shown in FIG. 3 with some rays traced to illustrate the optics. FIG. 5 shows the crossbar switch from three views; note that the system lacks rotational symmetry and that some lenses (cylindrical lenses) only focus in one view. Also note that for clarity the DMD is shown as being a transmissive rather than a reflective five-by-five device. The five inputs are five intensity modulated laser diodes, and the lasers' light is brought in by the vertical array of five equally spaced optical fibers 136 which typically may be 100 $\mu$m diameter fibers spaced about 100 $\mu$m apart. The fibers can be closely packed, while the laser diodes can be separated for electromagnetic isolation and ease of packaging. In the top view of FIG. 5 the light from the fibers is diverged to the width of a row of pixels in DMD 130. Lens 144 collimates the light to the plane of DMD 130. FIG. 5 illustrates fibers 151, 153, and 155 emitting light which illuminates pixel rows 161, 163, and 165 of DMD 130; DMD 130 is configured with only one pixel in row 161 and one pixel in row 165 deflected.

The collimated light reflects off of DMD 130 with the light reflecting from undeflected pixels and the area between the pixels having low spatial periodicity and thus being highly attenuated by the Schlieren stop 146 (this is illustrated by the dotted lines in the top view of FIG. 5). Contrarily, the light reflecting from deflected pixels will be phase modulated at a high spatial frequency and pass around Schlieren stop 146 with only mild attenuation as illustrated by the dotted line circles in the cross view of FIG. 5. The light passing Schlieren stop 146 is reimaged onto horizontal array 138 of receiving optical fibers with the light from a column of pixels of DMD 130 imaged onto a single receiving fiber. In FIG. 5 the second pixel of row 165 and the fourth pixel of row 161 are deflected and illuminated, so the second and fourth receiving fibers are illuminated. Ideally, only the light from the deflected pixel in one DMD row is imaged onto the appropriate output receiving fiber; however, a portion of light from the other undeflected rows (transmitted from the other input array fibers) will diffract around the vertical Schlieren stop and be focussed onto the same receiving fiber as the deflected light signal of interest. Thus care must be taken in design of both horizontal and vertical stop dimensions to maximize deflected to undeflected energy reaching receiving array 138.

Figures 6, 7:
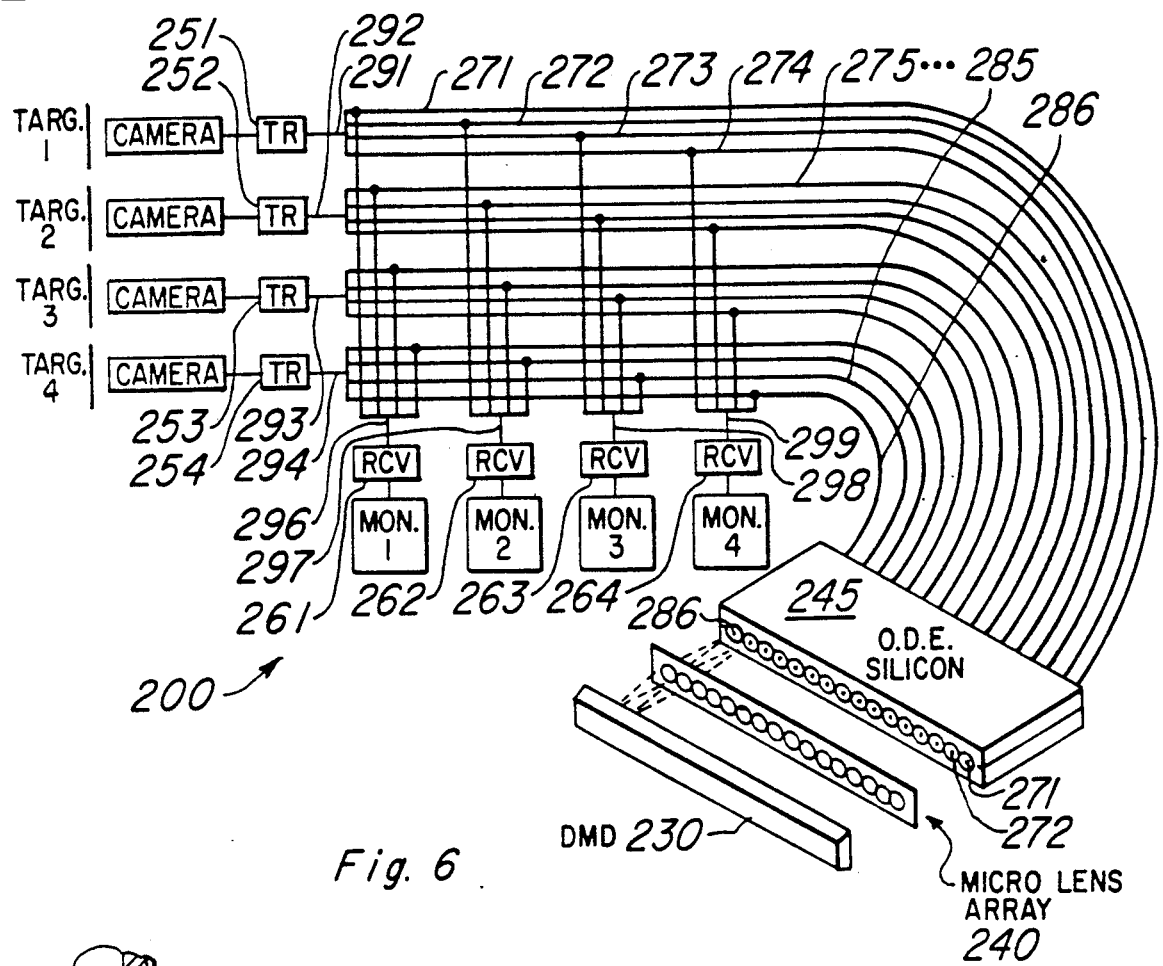
FIG. 6 is a perspective view of a first preferred embodiment.
FIG. 7 is a cross sectional elevation view of the lens aspects of the first preferred embodiment.

The first preferred embodiment optical interconnection network is a 4×4 crossbar switch and is schematically illustrated in exploded perspective view and denoted by reference numeral 200 in FIG. 6. Crossbar switch 200 includes four transmitters 251, 252, 253, and 254, four receivers 261, 262, 263, and 264, sixteen bifurcated optical fibers 271, 272, . . . 286, micro lens array 240 including sixteen lenses, and linear DMD 230 including sixteen pixels.

Each transmitter 251, . . . 254 contains a narrow bandwidth optical source, such as an LED or laser diode, driven by an analog or digital input signal. In FIG. 6 the inputs are digitized video data streams. Each transmitter 251, . . . 254 applies its output to a 1:4 fiber optical splitter 291, . . . 294, and each of the sixteen splitter outputs feeds one of the two equivalent legs of a 2:1 bifurcated optical fiber 271, . . . 286. The remaining equivalent legs of the sixteen bifurcated optical fibers are attached (in groups of four) to four 4:1 combiners 296, . . . , 299; the output of each combiner feeds one optical receiver 261, . . . , 264. The grouping is accomplished so that a bifurcated fiber attached to each transmitter is routed to each receiver. This provides all possible interconnection paths. The configuration of the DMD controls the paths over which data is actually transmitted.

The single ends of the bifurcated optical fibers 271, 272, . . . , 286 are epoxied into orientation-dependently etched grooves of a pair of silicon chips 245 to form a linear array with center-to-center spacing of about 250 microns; the silicon chips form a sandwich about 500 microns thick. The ends of the optical fibers 271, 272, . . . 286 are polished flush with the end surfaces of the silicon chips. The optical fibers 271, 272, . . . 286 each have a 50 micron core diameter with a 125 micron outside diameter. Light emanating from transmitters 251, . . . , 254 propagates towards silicon chips 245 but not directly to any of receivers 261, . . . , 264. Light reflecting from DMD 230 and undergoing a double pass through lens array 240 reenters optical fibers 271, 272, . . . 286 at silicon chips 245 propagates towards receivers 261, . . . 264 but not directly back to transmitters 251, . . . 254.

Micro lens array 240 has sixteen lens in a linear array with the same spacing as the center-to-center spacing of optical fibers 271, 272, . . . 286 in silicon chips 245. Each lens of array 240 has a focal length of about 0.4 mm and a numerical aperture appropriate for the optical fiber used. DMD 230 has a linear array of pixels with torsion beam mirror elements having center-to-center spacing the same as that of the optical fibers 271, 272, ... 286 in silicon chips 245; and each torsion beam fills an area of about 50 microns by 50 microns (about the same as the core diameter of optical fibers 271, 272, ... 286). Micro lens array 240 is glued to silicon chips 245 with the lenses spaced about 0.8 mm from the ends of the fibers and with each optical fiber aligned to a corresponding lens; and DMD 230 is, in turn, glued or connectorized to micro lens array 240 with the lenses spaced about 0.8 mm from the torsion beams and with a torsion beam aligned to each fiber end and micro lens pair so that light emitting from the end of a particular optical fiber is imaged by the corresponding micro lens onto the corresponding torsion beam. If a torsion beam is undeflected, then light emitted from a fiber end and imaged onto the torsion beam by a micro lens is reflected and reimaged by the micro lens back onto the fiber end; whereas, if a torsion beam is deflected, then the light emitted from a fiber end is reflected off axis from the micro lenses and does not enter any of the fiber ends.

FIG. 7 is a cross sectional elevation view illustrating ray tracings for the cases of an undeflected torsion beam (solid lines) and a deflected torsion beam (dotted lines). For the undeflected torsion beam the specular reflection of the impinging light cone along the axis of the micro lens is another light cone also aligned along the axis and substantially retracing the impinging light cone except for misalignments. For the deflected torsion beam the specular reflection is a light cone aligned off axis by $2\theta$ where $\theta$ is the angle of deflection of the torsion beam. This deflection of the reflected light cone from a deflected torsion beam implies that only a small amount of diffusely scattered light is reflected back into the pupil of the micro lens and reimaged on the end of the optical fiber core for any $\theta$ greater than the half angle of the light cone associated with the numerical aperture of the optical fibers used.

The size of crossbar switch 200 can easily be scaled up. For example, linear DMDs with 400 or 2,500 pixels are manufacturable, and such DMDs would support crossbar switches with 20 or 50 inputs and outputs. If array DMDs are considered, then 128 by 128 have already been manufactured and larger are manufacturable. Note that a crossbar switch with an array DMD would also have an array of optical fibers and micro lenses and would appear similar to the schematic arrangement of FIG. 1b with optical fiber splitters and combiners used, respectively, for the spreading and collapsing of the light.

Compared to electronic crossbar switches, crossbar switch 200 provides the advantages of data switching at its transmitted rate with no need for detection, demultiplexing, and subsequent remultiplexing; plus almost complete EMI and RFI immunity, consumption of little conventional board space, and optional remote location from signal sources and processors without engendering performance penalties. Power requirements are low, and component count and complexity is minimized.

Compared to other optical switches, crossbar switch 200 provides the advantages of low cost (large numbers of the light switching elements are integrally fabricated with their silicon addressing circuits) and ease of application because no polarization rotation or other secondary effect is involved in the modulation of the switched light intensity. Additionally, deformable mirror device based switches have little senitivity to the wavelength of the input light, being highly relfective from the ultraviolet through ten micron infrared radiation. Similarly, switch 200 is insensitive to the polarization of the input light.

Crossbar switch 200 is non-blocking, and has a minimum number of components to align compared to other free space switches. In comparison to monolithic waveguided switches, crossbar switch 200 requires no electrooptically active substrates and no waveguide implantation or fabrication. Switch 200 affords the fabrication of many more switching elements on an individual substrate; the greater number of switching elements and their stand-alone nature allows designs that offer improved yield and/or redundancy.

When DMDs are used as the switching elements as in crossbar switch 200, the speed of reconfiguration can be much faster than when liquid crystal spatial light modulators are used. For large switches, reconfiguration speed of DMD-based crossbar switches can exceed that of magnetooptic and other non-semiconductor based switches as well, since switch speed is dominated by multiplexed addressing time and not by the switching speed of individual elements.

Figure 8A:
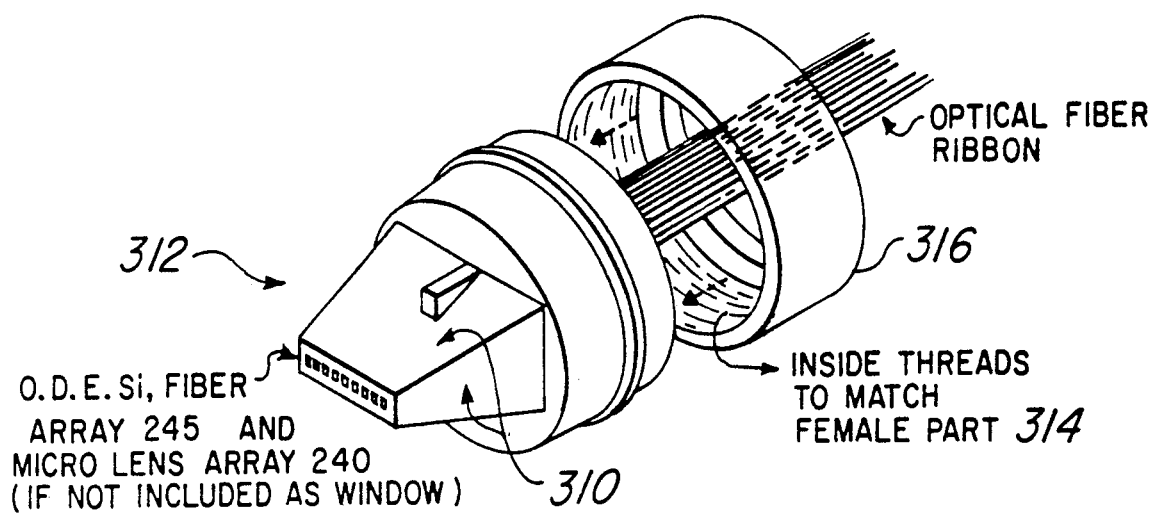
FIGS. 8a-c illustrates a preferred embodiment connector.
Figure 8B:
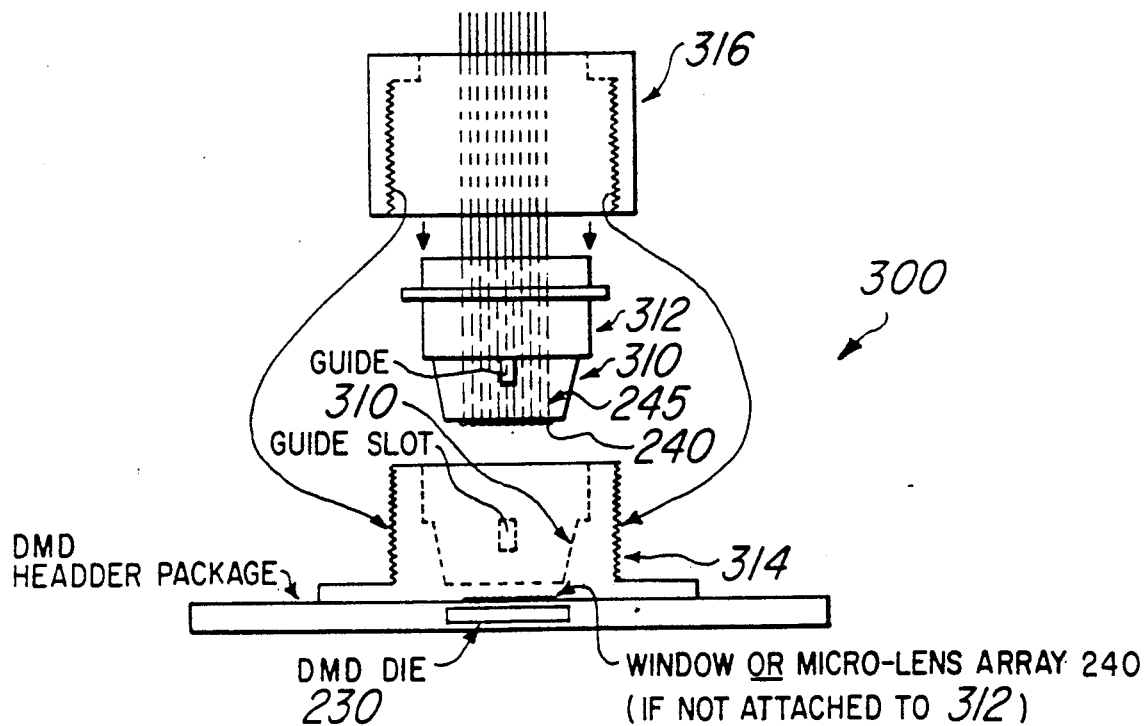
Figure 8C:
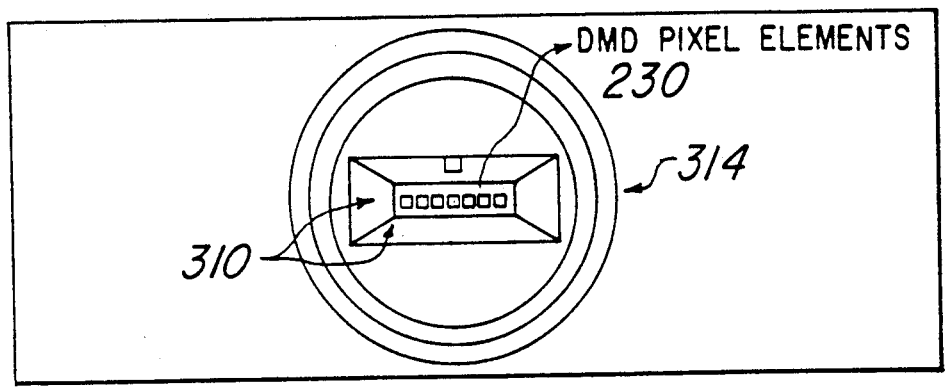

FIGS. 8a-c illustrate a preferred embodiment connector 300 for attaching optical fiber array 245 to micro lens array 240 and DMD 230 rather than gluing the items together. FIG. 8a is a perspective view with FIGS. 8b-c cross sectional elevation and plan views. Connector 300 includes a self-aligning bevel 310 in both planes perpendicular to the plane of the DMD. Male part 312 of connector 300 houses silicon chips 245 with optical fibers and micro lens array 240, and the female part 314 of connector 300 attaches to the package for DMD 230. The two parts of connector 300 are connected by threaded sleeve 316.

Connector 300 would be used in applications where high mechanical stability is not a top priority such as computer interconnection networks. Although DMD 230 has a large mean time before failure, use of connector 300 permits replacement of DMD 230 without disruption of the remainder of the system. Contrarily, in non-accessible applications, such as in a missle, the glued together approach provides less weight and higher mechanical stability.

FIG. 8b also illustrates the possibility of attaching micro lens array 240 to the DMD, especially if the DMD is packaged in a manner analogous to EPROMs: a plastic DIP package with a window over the die. Attaching the micro lens array to a package window avoids an extra transmission plate in the optical path because the micro lens array effectively merges with the window.

Figure 9:
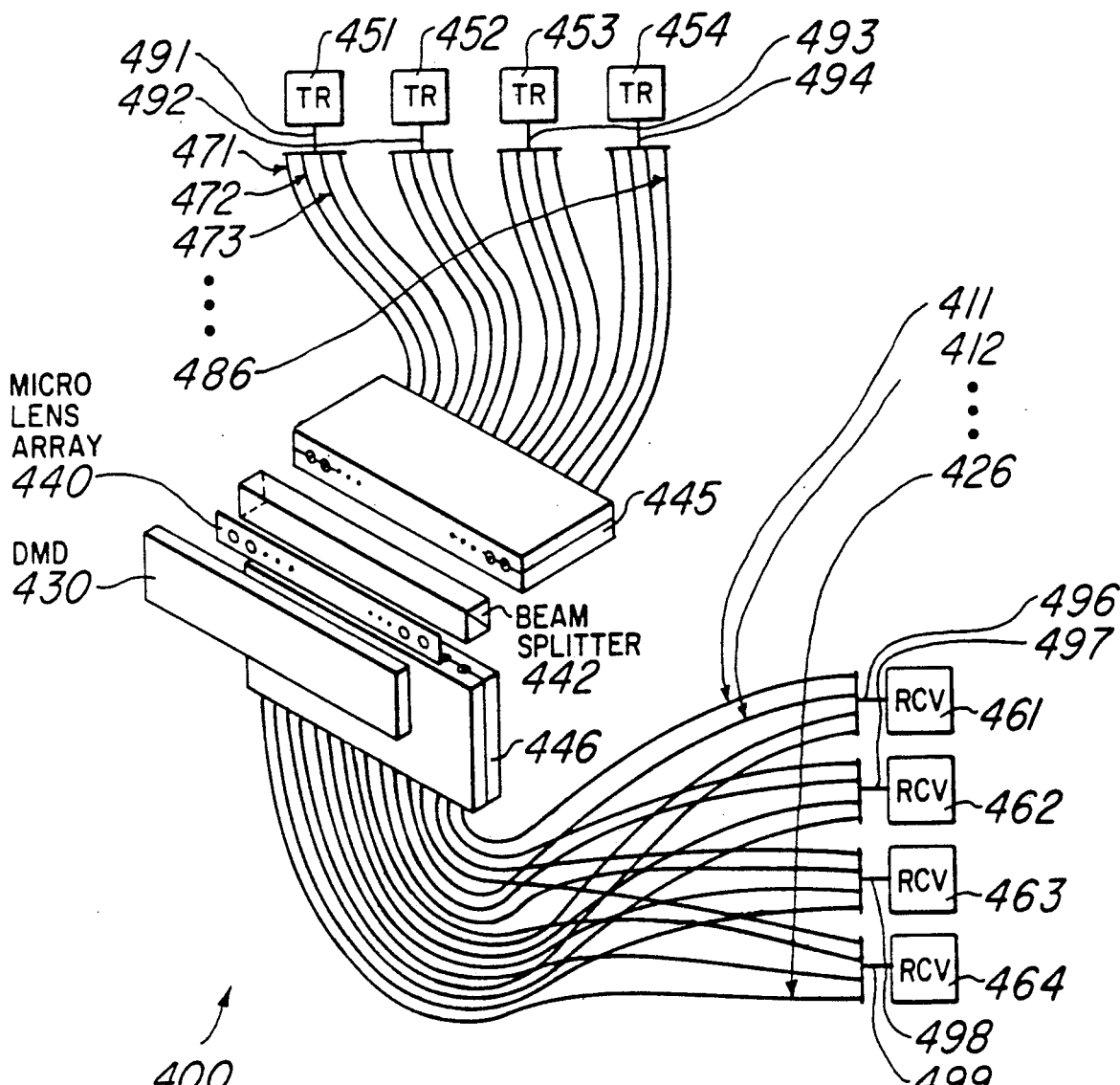
FIG. 9 is a perspective view of a second preferred embodiment.

Second preferred embodiment optical interconnection network is a 4×4 crossbar switch and is schematically illustrated in exploded perspective view in FIG. 9 and denoted by reference numeral 400. Crossbar switch 400 includes four transmitters 451, 452, 453, and 454, four receivers 461, 462, 463, and 464, four 1:4 optical fiber splitters 491, 492, 493, and 494 connected to the transmitters, four 4:1 optical fiber combiners 496, 497, 498, and 499 connected to the receivers, a first set of sixteen optical fibers 471, 472, ... 486 connected to the splitters, a second set of sixteen optical fibers 411, 412, ... 426 connected to the combiners, beam splitter 442, micro lens array 440 including sixteen lenses, and linear DMD 430 including sixteen pixels.

Figure 10:
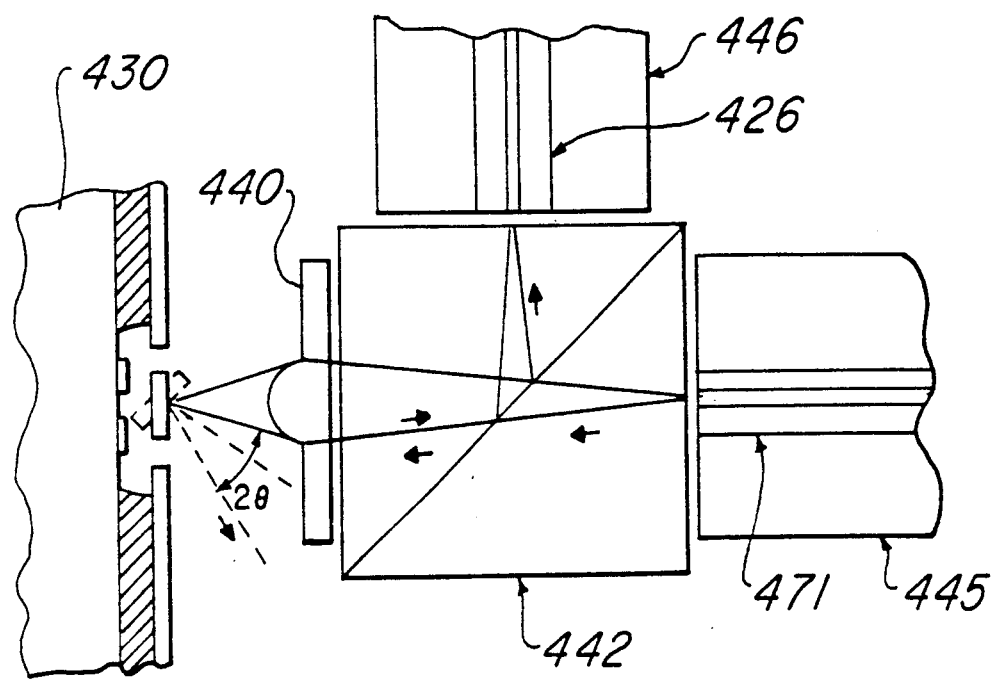
FIG. 10 is a cross sectional elevation view of the lens aspects of the second preferred embodiment.

Each transmitter 451, 452, 453, and 454 contains a narrow bandwidth optical source driven by analog or digital signals; each transmitter applies its output to one of the 1:4 optical fiber splitters 491, 492, 493, and 494. The sixteen optical fibers 471, ... 486 from the splitters are mounted in a silicon chip sandwich 445 analogous to silicon chips 245 of switch 200, and light emitted by the sixteen optical fibers 471, ... 486 is directed into beam splitter 442 and imaged by the sixteen lenses of micro lens array 440 onto the sixteen pixels of DMD 430. FIG. 10 is a cross sectional view in a plane containing optical fibers 471 and 426 (cross sections through planes containing other pairs of optical fibers are similar). The small arrows in FIG. 10 indicate the cone of light emitted from the core of optical fiber 471 passing through beam splitter 442 (the reflected portion is not shown for clarity), being imaged by a micro lens from array 440 onto a torsion beam of DMD 430, being reflected back to the micro lens (if the torsion beam is deflected through angle $\theta$, then the light cone is reflected beyond the pupil of the micro lens), and being reimaged and reflected by the beam splitter into the core of optical fiber 426 (the portion passing through the beam splitter is not shown for clarity). Thus DMD 430 acts as a set of switches that make or break each of the sixteen optical paths from transmitters 451, ... 454 to receivers 461, ... 464.

Micro lens array 440 is attached to beam splitter 442; silicon chip sandwiches 445 and 446 may also be attached to beam splitter 442. As with crossbar switch 200, the center-to-center spacing of the optical fibers in silicon chip sandwich 445 is the same as the center-to-center spacing of the micro lenses in array 440, the center-to-center spacing of the optical fibers in silicon chip sandwich 446, and the center-to-center spacing of the pixels of DMD 430. Crossbar switch 400 has an advantage over crossbar switch 200 for pixels that are deflected because a small fraction of the light transmitted down one leg of one of the bifurcated optical fibers 271, ... 286 by one of the transmitters 251, ... 254 will leak into the other leg and be received by the corresponding receiver 261, ... 264, whereas the optical fibers are isolated from one another in crossbar switch 400.

Figure 11:
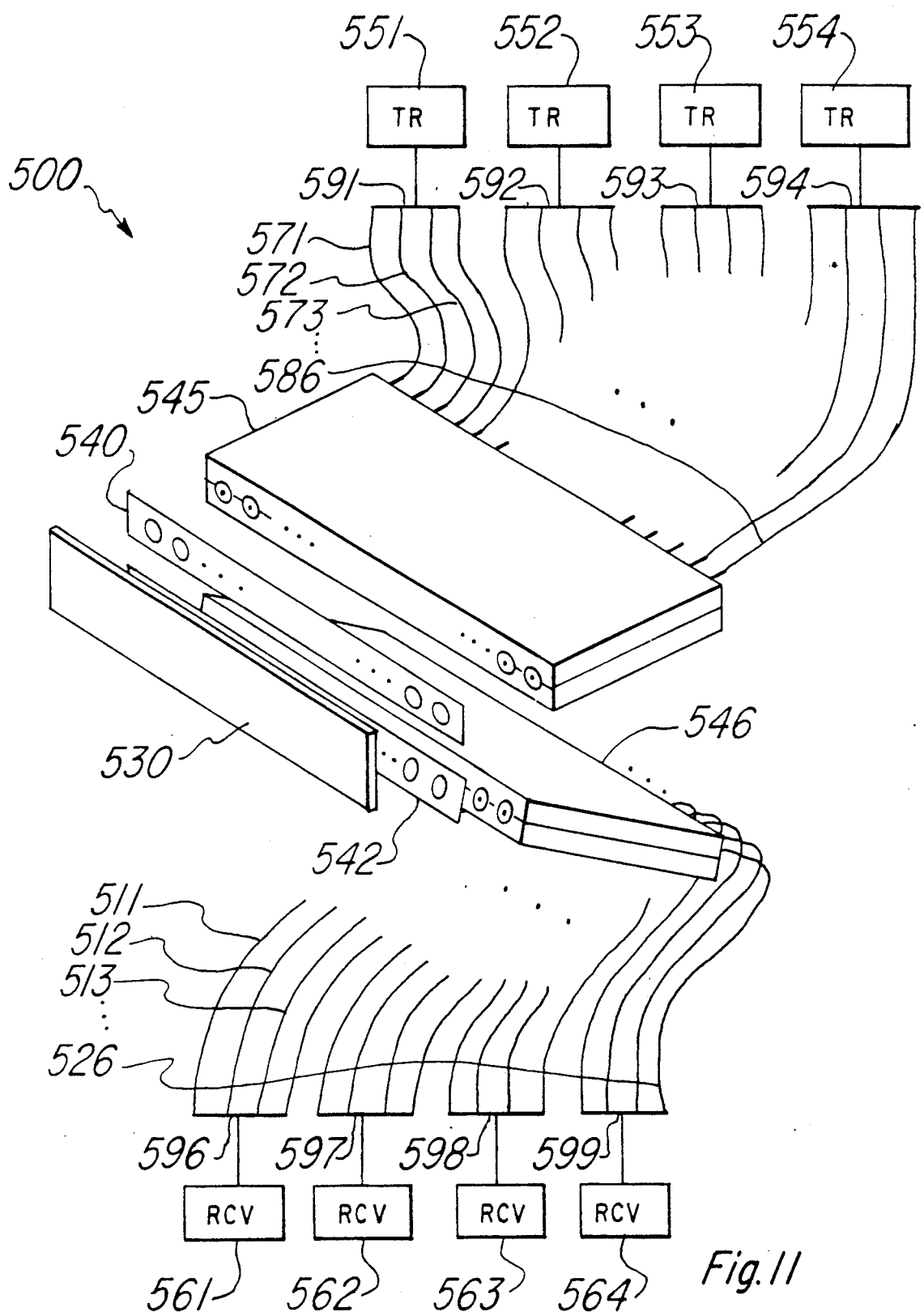
FIG. 11 is a perspective view of a third preferred embodiment.

Third preferred embodiment optical interconnection network is a 4×4 crossbar switch and is schematically illustrated in exploded perspective view in FIG. 11 and denoted by reference numeral 500. Crossbar switch 500 includes four transmitters 551, 552, 553, and 554, four receivers 561, 562, 563, and 564, four 1:4 optical fiber splitters 591, 592, 593, and 594 connected to the transmitters, four 4:1 optical fiber combiners 596, 597, 598, and 599 connected to the receivers, a first set of sixteen optical fibers 571, 572, ... 586 connected to the splitters, second set of sixteen optical fibers 511, 512, ... 526 connected to the combiners, micro lens array 540 including sixteen lenses, micro lens array 542 including sixteen lenses, and linear DMD 530 including sixteen pixels.

Figure 12:
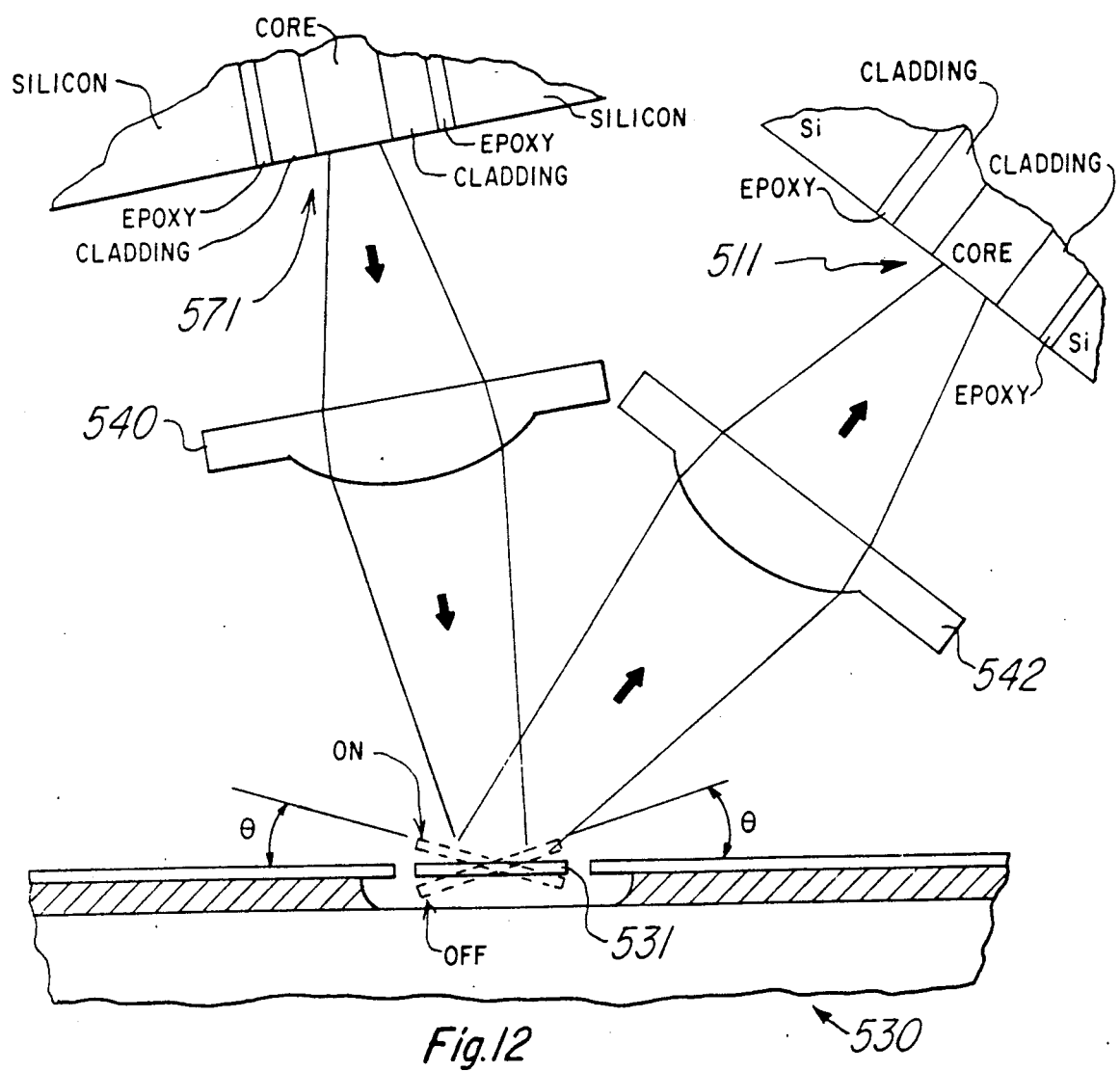
FIG. 12 is a cross sectional elevation view of the lens aspects of the third preferred embodiment.

Each transmitter 551, 552, 553, and 554 contains a narrow bandwidth optical source driven by analog or digital signals; each transmitter applies its output to one of the 1:4 optical fiber splitters 591, 592, 593, and 594. The sixteen optical fibers 571, ... 586 from the splitters are mounted in a silicon chip sandwich 545 analogous to silicon chips 245 of switch 200, and light emitted by the sixteen optical fibers 571, ... 586 is imaged by the sixteen lenses of micro lens array 540 onto the the sixteen pixels of DMD 530. FIG. 12 is a cross sectional view in a plane containing optical fibers 571 and 511 (cross sections through planes containing other pairs of optical fibers are similar). The small arrows in FIG. 12 indicate the cone of light emitted from the core of optical fiber 571 being imaged by a micro lens from array 540 onto a torsion beam mirror element of DMD 530, being reflected to the micro lens 542 if the torsion beam is deflected to the "ON" state (if the torsion beam is undeflected or deflected to the "OFF" state, then the light cone is reflected beyond the pupil of the micro lens), and being reimaged into the core of optical fiber 511. Thus DMD 530 acts as a set of switches that make or break each of the sixteen optical paths from transmitters 551, ... 554 to receivers 561, ... 564.

Each of the lenses in micro lens arrays 540 and 542 has a focal length of about 200 $\mu$m and is located about 400 $\mu$m from both the end of the corresponding fiber (511, 512, ... 526, 571, 572, ... or 586) and deflectable beam 531 of DMD 530. Each lens may have diameter of about 160 $\mu$m and the magnification from fiber end to DMD beam and from DMD beam to fiber end is about 1. Micro lens arrays 540 and 542 are shown as separate items in FIG. 12, but they may be fabricated as a single unit. In experiments micro lens arrays 540 and 542 have each been attached to a glass substrate which also carries one of silicon chip sandwiches 545 and 546; these glass substrates are then aligned to DMD 530. As with crossbar switch 200, the center-to-center spacing of the optical fibers in silicon chip sandwich 545 is the same as the center-to-center spacing of the micro lenses in arrays 540 and 542, the center-to-center spacing of the optical fibers in silicon chip sandwich 546, and the center-to-center spacing of the pixels of DMD 530. Crossbar switch 500 has an advantage over crossbar switch 200 as follows: even if a pixel in crossbar switch 200 is deflected in order to interrupt the light input from a transmitter 251, ... 254 from reaching a receiver 261, ... 264, a small fraction of the light transmitted down one leg of one of the bifurcated optical fibers 271, ... 286 by one of the transmitters 251, ... 254 will leak into the other leg and be received by the corresponding receiver 261, ... 264. In contrast, the input and output optical fibers are isolated from one another in crossbar switch 500.

Both silicon chip sandwiches 545 and 546 may be inserted into a bevelled connector similar to connector 300 although the wedge angle may be larger. Also, the two micro lens arrays 540 and 542 could be fabricated together as two parallel rows of micro lenses with the light passing off axis through the lenses; this would permit a simple lens array and mounting over the DMD as shown in FIG. 8b.

Figure 13:
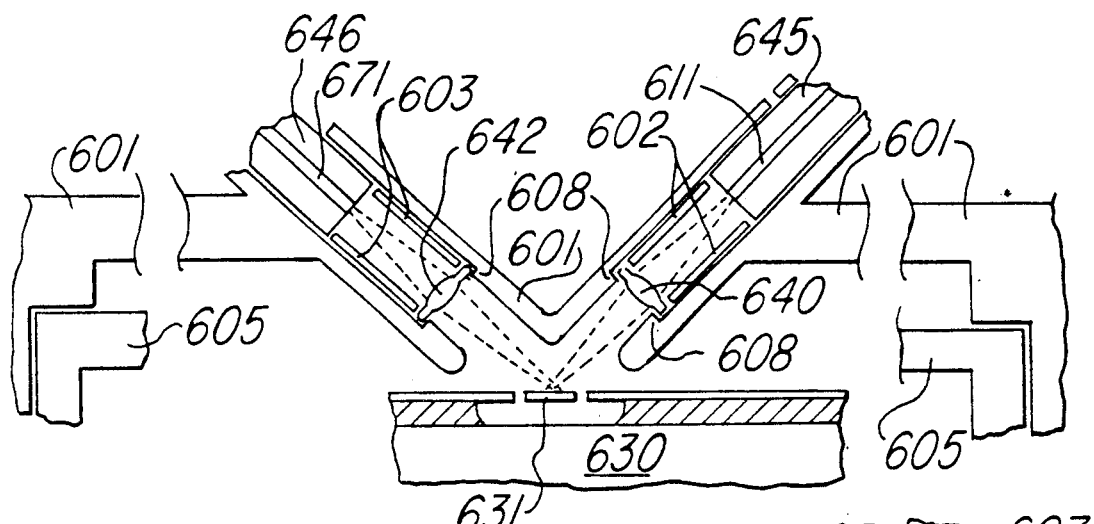
FIG. 13 is a cross sectional elevation view of a version of the fourth preferred embodiment.
Figure 13A:
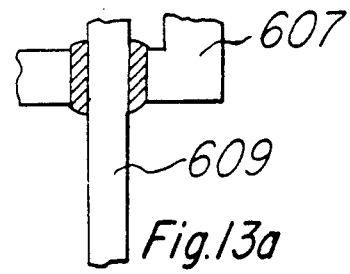

The fourth preferred embodiment is shown in cross sectional elevation view in FIG. 13 and includes oversize pixels and oversize lenses to provide design robustness. In particular, optical fibers 611 and 671 have 50 $\mu$m diameter cores and are in silicon sandwiches 645 and 646 (as with the third preferred embodiment) which in turn are mounted in plastic package 601 which has the general shape of a rectangle with a with a "V" for holding the silicon sandwiches with rectangular spacers 602 and 603 separating microlens arrays 640 and 642 from silicon sandwiches 645 and 646. The silicon sandwiches are glued (such as with a room temperature vulcanizing silicone) into the "V". This permits simple assembly in that a microlens array is inserted into one of the arms of the "V" and stops on ledge 608, a spacer is inserted to rest on the microlens array, and a silicon sandwich is inserted to abut the spacer and then is glued in place. The lenses of microlens arrays 640 and 642 have diameters of 250 μm and focal lengths of 200 μm, and the pixels of DMD 630 have deflectable torsion beam mirror elements 631 that are roughly octagonal with a diameter of about 100 μm. DMD 630 is mounted in a header as illustrated schematically in FIG. 8b, the header has a metal top 605 with a hole over the active area of DMD 630. Metal top 605 fits into package 601 with a tolerance of about 1 mil (25 μm), and DMD 630 is located on header 607 to within a lateral tolerance of about 1 mil relative to the metal top 605; thus the images of the fiber ends will be on the torsion beams because of the large size of the beams, and simple assembly of the fourth preferred embodiment arises from the oversizes. Note that in FIG. 13 the vertical is compressed to show all of the features; in practice, metal top 605 is sufficiently vertically separated from DMD 630 to permit bond wires from the DMD die to the header pins 609 to fit under metal top 605. The DMD die can be silvered to header 607 which will provide a substrate ground.

Alternative packaging could be similar to the connector of FIGS. 8a–c, except the large size of the "V" due to the use of both input and output fibers makes the diameter of the threadings as large as the header. Thus a variation would use a threaded part so large that the header fits inside the threading so that the threaded part plays the role of metal top 605; and the bevelling coincides with the "V".

Figures 14A, 14B:
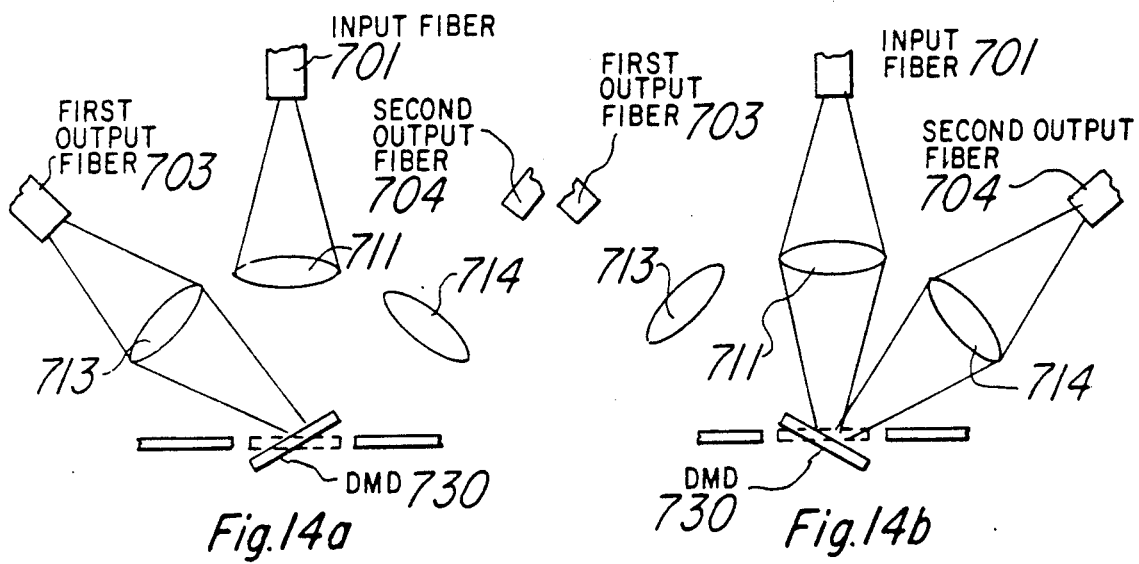
FIGS. 14a-b are cross sectional view of a fifth preferred embodiment.

FIGS. 14a–b illustrate a fifth preferred embodiment that uses both directions of deflection available with torsion beam DMDs to have one input array of optical fibers 701 and two output arrays of optical fibers 703 and 704. Each array of optical fibers has a corresponding microlens array (711, 713, 714). DMD 730 selects between the two outputs or, by no deflection, selects neither output by reflecting the light back into the input.

MODIFICATIONS AND ADVANTAGES

Figure 15:
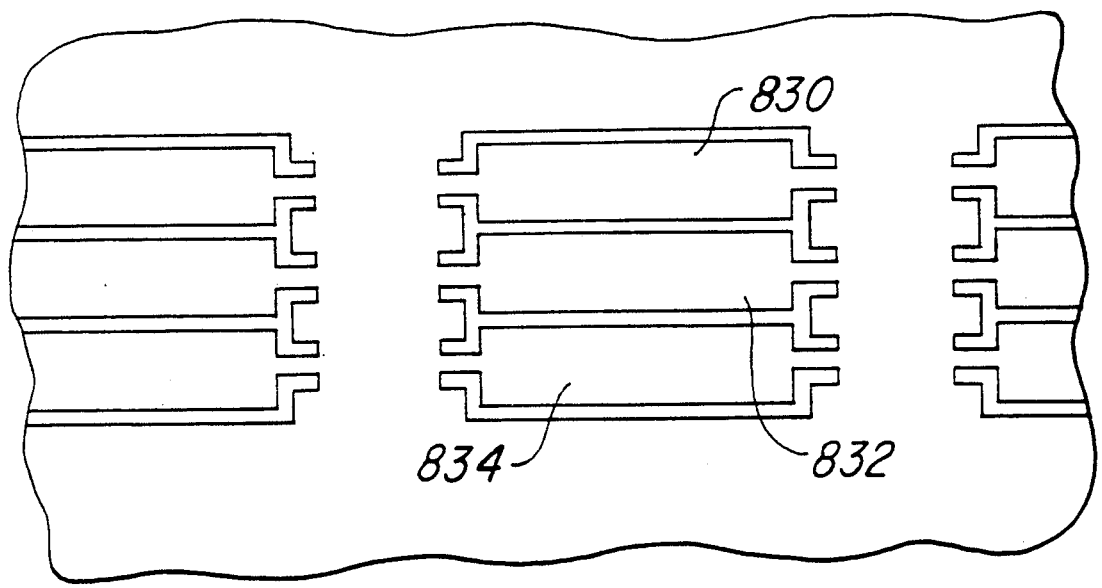
FIG. 15 is a plan view of a pixel architecture.

Various modifications of the preferred embodiment devices and methods may be made while retaining the features of using a lens system with input and output optical fibers and a spatial light modulator for imaging light emitted by the optical fibers onto a spatial light modulator and imaging the light reflected from the spatial light modulator back to the optical fibers. For example, variations could be made in the sizes and shapes of the reflective spatial light modulator, the mechanical structure of its deflecting elements, the number and geometrical arrangement of pixels, the number of mirror elements per pixel, the pixel shape and spacing, the size and shape of the optical fiber bundles such as square arrays, the optical fibers replaced with photolithographically fabricated waveguides, the lens system could be an array of micro lenses attached to or separated from the optical fiber array or a single large imaging lens or lens system, and polarized light and fibers could be used. Also, a mask for light extinction may be inserted, especially when the lenses have numerical apertures not matched to that of the optical fibers or the $\theta$ of the DMD pixels. Tightly packed mirror elements which are large relative to the optical fiber core diameter increases alignment tolerances because the image of the optical fiber core may be much smaller than the mirror element. FIG. 15 illustrates a pixel architecture that permits large deflection angle (due to the narrow torsion beams 830, 832, 834) plus large mirror area per pixel (due to the multiple torsion beams 830, 832, and 834 per pixel). Further, by tilting the DMD through the angle $\theta$ of pixel deflection, the deflected pixels could reflect light back into the optical fibers and the undeflected pixels could reflect light out of the lens pupil.

The light emitters and receivers may be AlGaAs lasers and photodiodes monolithically fabricated on a GaAs-on-silicon wafer together with silicon devices and silicon dioxide light guides between the emitters/receivers and an array at the edge of the die for alignment with the spatial light modulator.

The invention provides the advantages of small size, light weight, and mechanical stability.

What is claimed is:

1. An optical crossbar switch, comprising:
a plurality of input optical fibers;
a plurality of output optical fibers;
a spatial light modulator with a plurality of reflective pixels, each of said pixels including a torsion beam mirror element and having at least first and second states;
an optical system imaging light emitted rom a first end of one of said input optical fibers onto a corresponding pixel of said spatial light modulator, and reimaging said light after reflection from said corresponding pixel if said pixel is in said first state but not if said pixel is in said second state onto a corresponding first end of one of said output optical fibers;
an input linear array of microlenses for said first ends of said input optical fibers; and
an output linear array of microlenses for said first ends of said output optical fibers.

2. The crossbar switch of claim 1, further comprising;
an input holder for said first ends of said input optical fibers;
an output holder for said first ends of said output optical fibers;
an input spacer between and abutting said input holder and said input array of lenses and an output spacer between and abutting said output holder and said output array of lenses.

3. An optical crossbar switch, comprising:
N optical emitters;
a plurality of input optical fibers;
N optical splitters, each of said N splitters a 1:M splitter and coupled to one of said N optical emitters, and each output of each of said splitters coupled to a corresponding one of said input optical fibers;
M optical receivers;
a plurality of output optical fibers;
M optical combiners, each of said M combiners a N:1 combiner and coupled to one of said M optical receivers, and each input of each of said combiners coupled to a corresponding one of said output optical fibers;
a spatial light modulator with N×M reflective pixels, each of said pixels including a torsion beam mirror element and having at least first and second states;
an optical system imaging light emitted rom a first end of one of said input optical fibers onto a corresponding pixel of said spatial light modulator, and reimaging said light after reflection from said corresponding pixel if said pixel is in said first state but not if said pixel is in said second state onto a corresponding first end of one of said output optical fibers;

an input linear array of N×M microlenses for said first ends of said input optical fibers and an output linear array of N×M microlenses for said first ends of said output optical fibers; and whereby each of said N optical emitters is connected to or disconnected from each of said M optical receivers through one of N×M of said pixels.

4. The crossbar switch of claim 3, further comprising:
(a) an input holder for said first ends of said input optical fibers;
(b) an output holder for said first ends of said output optical fibers;
(c) an input spacer between and abutting said input holder and said input array of lenses and an output spacer between and abutting said output holder and said output array of lenses.

5. The crossbar switch of claim 4, wherein:
(a) said input holder is a sandwich of two grooved silicon substrates with said input optical fibers held in the grooves; and
(b) said output holder is a sandwich of two grooved silicon substrates with said output optical fibers held in the grooves.

6. The crossbar switch of claim 5, further comprising:
(a) a first connector part including said input and output holders, said input and output spacers, and said input and output arrays of microlenses in a first bevelled portion; and
(b) a second connector part including a second bevelled portion complementary to said first bevelled portion, said second bevelled portion attached to said reflective spatial light modulator; and
(c) fasteners coupling said first connector part to said second connector part.

7. An optical crossbar switch, comprising:
a plurality of input optical fibers;
a plurality of output optical fibers;
a plurality of second output optical fibers;
a spatial light modulator with a plurality of reflective pixels, each of said pixels having a first, second and third state;
an optical system imaging light emitted from a first end of one of said input optical fibers onto a corresponding pixel of said spatial light modulator, and reimaging said light after reflection from said corresponding pixel onto a first end of one of said first and second output optical fibers if said corresponding pixel is in said first state but not if said corresponding pixel is in said second state.

8. The crossbar switch of claim 7, further comprising:
N optical emitters;
N optical splitters, each of said N splitters a 1:M splitter and coupled to one of said N optical emitters, and each output of each of said splitters coupled to a corresponding one of said input optical fibers; and
M optical receivers;
M optical combiners, each of said M combiners a N:1 combiner and coupled to one of said M optical receivers, and each input of each said combiners coupled to a corresponding one of said output optical fibers;
whereby each of said N optical emitters is connected to or disconnected from each of said M optical receivers through one of N×M of said pixels.

9. An optical interconnection network, comprising:
(a) N input optical fibers;
(b) N output optical fibers;
(c) an N pixel spatial light modulator;
(d) a first microlens array with N lenses, said first lens array located to image light emitted from said input optical fibers onto and pixels; and
(e) a second microlens array with N lenses, said second lens array located to reimage light from said pixels to said output optical fibers.

10. The network of claim 9, wherein:
(a) said spatial light modulator including a linear array of pixels, each of pixels including a torsion beam mirror element; and
(b) said microlens arrays each including a linear array of microlenses, one lens for each of said pixels.

11. The network of claim 9, further comprising:
(a) N second output optical fibers;
(b) a third microlens array with N lenses, said third lens array located to reimage light from said pixels to said second output optical fibers.

* * * * *